Oct. 23, 1962 R. J. HANSEN 3,060,424
SIGNAL SIMULATOR
Filed Aug. 20, 1957 2 Sheets-Sheet 1

INVENTOR:
ROBERT J. HANSEN,
BY Michael Masnik
HIS ATTORNEY.

Oct. 23, 1962 R. J. HANSEN 3,060,424
SIGNAL SIMULATOR
Filed Aug. 20, 1957 2 Sheets-Sheet 2

INVENTOR:
ROBERT J. HANSEN,
BY *Michael Masnik*
HIS ATTORNEY.

United States Patent Office 3,060,424
Patented Oct. 23, 1962

3,060,424
SIGNAL SIMULATOR
Robert J. Hansen, Liverpool, N.Y., assignor to General
Electric Company, a corporation of New York
Filed Aug. 20, 1957, Ser. No. 679,321
7 Claims. (Cl. 343—17.7)

This invention relates to the generation of electrical signals and in particular the generation of electrical signals to be used for calibrating, monitoring and checking the operation of electrical apparatus.

There exists a need in the electrical arts of a signal simulator for purposes of instrumentation control, calibration, etc. The need is encountered in the calibration of multiple beam radio signal receiving and transmitting systems of the radar type. Heretofore such calibration has involved the placing of an object, either real or simulated, at a known altitude and range from the radar or object detection system. This approach has proven to be extremely expensive in its requirements of complicated and costly apparatus, and extremely time-consuming in executing the calibration. The difficulty of holding an object, such as an aircraft, at a specified range and altitude for a period of time is very great. This difficulty is eliminated and the accuracy and placement of a target is enhanced by the ease with which the calibration equipment can be introduced and removed from the normal operation of the object detection arrangement.

It is therefore an object of my invention to provide an improved signal processing arrangement and method.

Another object of my invention is to provide an improved arrangement for calibrating stacked-beam, height-finding radar apparatus.

Another object of my invention is to provide means for simulating object movement at any predetermined altitude for use with a radar object detection arrangement.

A further object is to provide an improved calibration arrangement.

In accordance with one embodiment of my invention, applicable to an object detection arrangement, test signals are generated for simulating the movement of an object at a predetermined altitude from the radar detection arrangement. In particular, the test signals comprise recurrent pulses each having an amplitude simulating an echo received from an object and processed by the directivity patterns of a stacked-beam, height-finding radar antenna arrangement.

Figure 1:
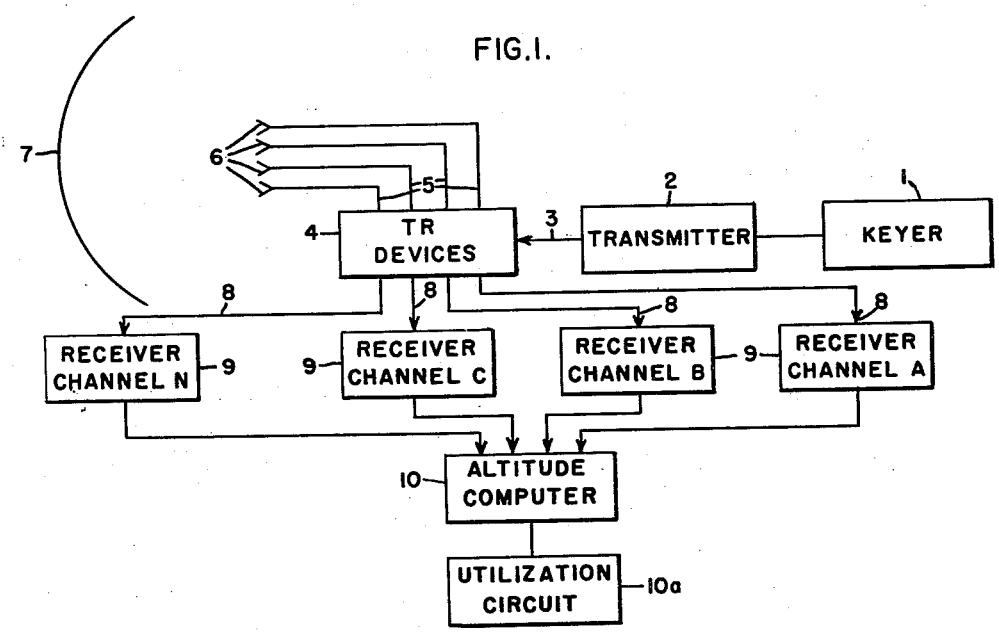
Figures 2A, 2B:
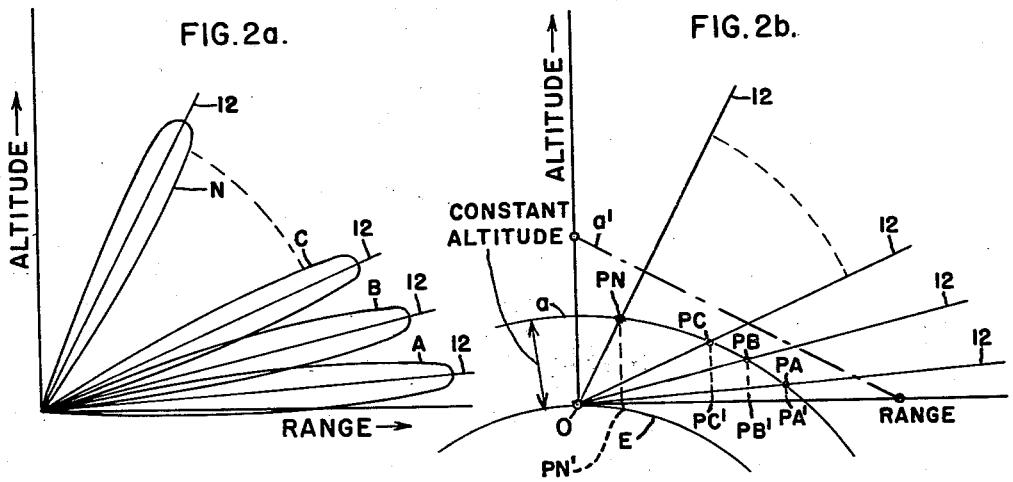
Figure 3:
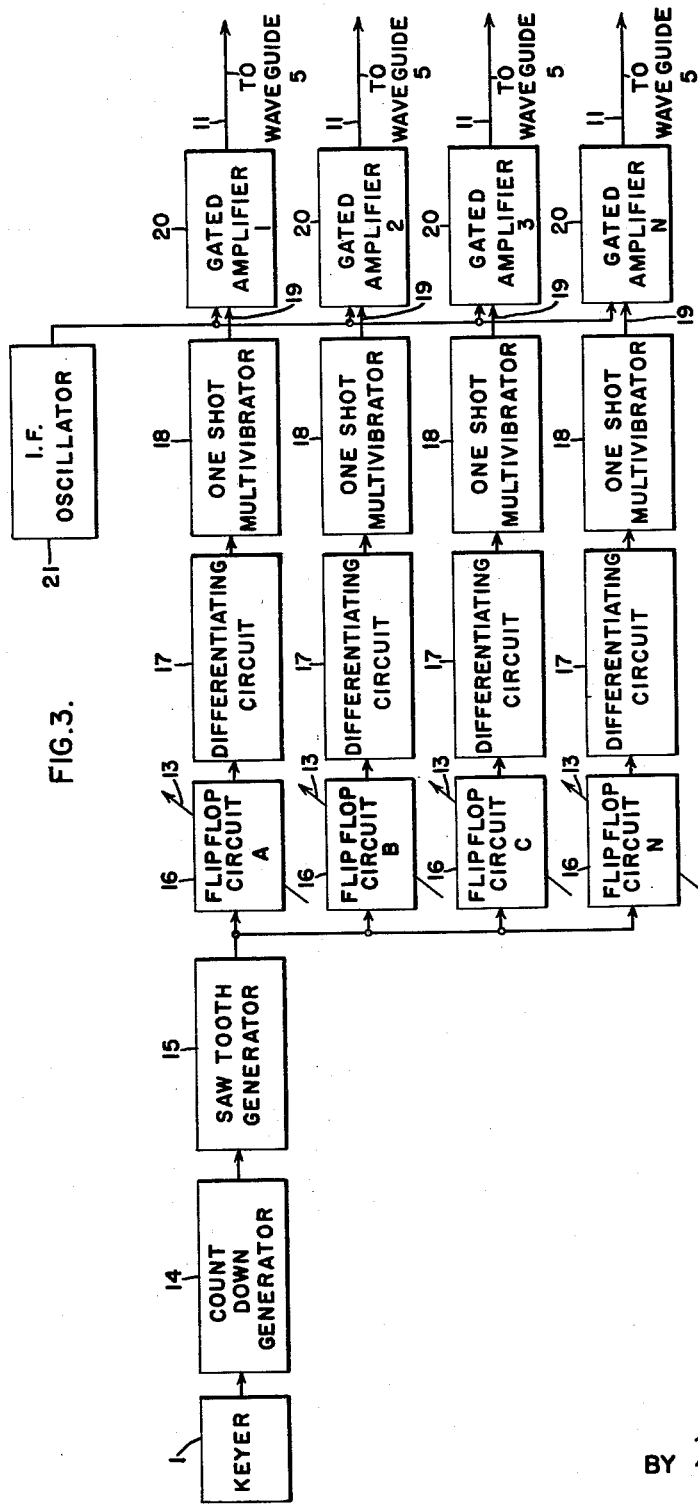
Figure 4:
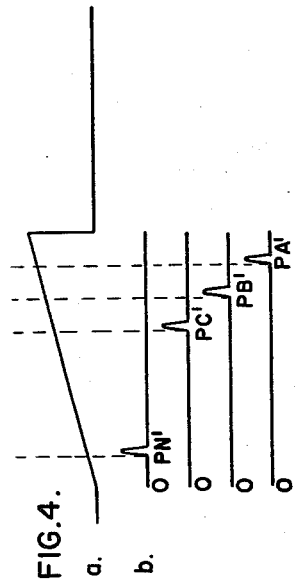

The features of the present invention which are believed to be novel are set forth with particularity in the appended claims. The present invention itself, both as to its organization and manner of operation, together with further objects and advantages thereof, may best be understood by reference to the following description taken in connection with the accompanying drawings in which FIG. 1 shows, in block diagram from, a simplified version of a stacked-beam, height-finding radar system. FIG. 2a illustrates certain waveforms describing the elevation directivity patterns of an antenna. FIG. 2b illustrates graphically the manner in which the calibration signals are developed from the waveform of FIG. 2a. FIG. 3 illustrates in block diagram form an arrangement for generating desired calibration signals simulating echoes detected by a stacked-beam antenna system and descriptive of the relative motion between an object and the object detection arrangement, and FIG. 4 illustrates graphically certain waveforms useful in explaining the operation of FIG. 3.

Referring to FIG. 1 there is shown a stacked-beam, height-finding radar comprising a source of keying pulses 1 occurring at a given pulse recurrence rate. These keying pulses are applied to the transmitter 2 which transmits high powered radar pulses over lead 3 to a TR device 4. The operation of the TR device will be described shortly. The radar pulses are transmitted simultaneously over the individual waveguides shown in single line form as 5 and exit at the remote end 6 into a reflector 7. The horns 6 associated with the separate waveguide sections 5 and the reflector 7 are dimensioned to provide a directivity pattern in elevation corresponding to that shown in FIG. 2a. For purposes of simplicity, the directivity pattern is shown to consist of a number of lobes A, B, C . . . to any number N. Any object in space intercepted by the transmitted radar pulse results in an echo of that transmitted pulse being returned to the radar object detection arrangement. Thus, an object, upon detection, causes an echo to be returned and received within the antenna directivity pattern of FIG. 2a. The echoes, after processing by the directive antenna arrangement, are applied over the several waveguides 5 through the TR devices 4 and over leads 8 to respective radio receiving channels which are shown as A, B, C . . . N. Each receiver channel 9 amplifies the echo portion corresponding to reception by a respective lobe of the antenna directivity pattern. Thus receiver channel A amplifies the portion of the echo received in directive lobe A, channel B amplifies the portion of the echo received in lobe B, etc. TR devices 4 operate in response to high-powered radar pulses to route the pulses available from transmitter 2 to the waveguide sections 5 and blocks the high-powered pulses from appearing in the receiver channels 9. On the other hand, the TR device operates in response to relatively weak echoes received over the waveguides 5 upon detection of an object to route these weak echoes to respective receiver channels 9 while preventing the weak echoes from being dissipated in the transmitter 2. TR devices of this type are well known in the art.

The echoes available from the various receivers 9 are combined and applied to the altitude computer 10. The signals available from the receiver 9 are at a video level and have an amplitude and elevation angle which is dependent upon the manner in which an echo is received within the various directivity patterns shown in FIG. 2a. The altitude and angle from which the echo is received is computed by a signal comparison process. This information may then be applied to utilization circuits 10a for display or other purposes.

In order to achieve optimum operation of radar object detection arrangement as shown in FIG. 1, it is necessary to periodically calibrate and measure the performance of such a system. Heretofore this has been done by having an aircraft fly at a known altitude, hold at a particular range, and communicate with the radar site at all times. This procedure has proven to be extremely time-consuming, costly and difficult to correlate. To provide proper calibration of an arrangement such as that shown in FIG. 1, the present invention proposes an arrangement such as that shown in FIG. 3. For purposes of simplicity, FIGS. 3 and 1 employ common reference to denote similar components. The arrangement shown in FIG. 3 is capable of generating signals in response to the keying pulses available from keyer 1 over respective output leads 11 for application to waveguide sections 5. In this particular application, the signals would appear at an RF level. However, the invention can be practiced by generating the plurality of signals on lead 11 at an intermediate frequency level. In this case the signals may be injected directly over lead 8 to the various receiver channels.

The arrangement of FIG. 3 generates a plurality of recurrent pulses wherein each pulse simulates an echo describing a detected object flying at a predetermined altitude and passing successively through the center lines of the various lobes, A, B, C . . . N of the elevation directivity pattern of FIG. 2a. Referring to FIG. 2b the solid radial lines 12 correspond to the center lines of the directivity patterns A, B, C . . . N shown in FIG. 2a. The (solid) line a corresponds to the constant altitude flight of an object above the surface of the earth shown in curve form at E. The point O corresponds to the position of the radar object detection arrangement on the surface of the earth E. It is seen that the constant altitude flight intersects each of the lines corresponding to the center lines of the antenna lobes at points $P_A$, $P_B$, $P_C$ . . . $P_N$. It is easily seen that such a constant altitude flight will cross the center lines of the beams at various ranges, also that the antenna pattern is fixed and not variable in the radar system. Thus it is seen that a test signal which could be inserted in each receiver channel at the appropriate range would be descriptive of an aircraft flight through the directivity patterns of the radar. The requisite timing signals are generated in the following manner. In FIG. 3, keying pulses available from 1 at a pulse recurrence rate are applied through a count-down generator 14 to a sawtooth generator 15. For purposes of our initial discussion, it shall be assumed that count-down generator introduces a 1 to 1 count-down. Thus, in response to each keying pulse, there is generated a sawtooth waveform such as that shown in FIG. 4a. The sawtooth waveform is applied simultaneously to a plurality of biased flip-flop multivibrator circuits 16 associated with respective receiver channels 9 of FIG. 1. The circuits 16 may constitute triggered multivibrators which are biased to provide an output pulse on their respective output leads 15 having the timings shown in FIG. 4b. The various timing pulses shown in FIG. 4b correspond to the timing intervals OPA, OPB, OPC . . . OPN shown in FIG. 2b. The controls determining the biasing of the various flip-flops 14, and therefore the timing of the pulses of FIG. 4b, are adjusted in accordance with the known directivity pattern of the antenna system. The bias controls (13) for each of the flip-flops 16 are adjusted to provide an output timing pulse as shown in FIG. 4b. Thus the pulse in FIG. 4b associated with the timing interval OPN describes a constant altitude flight "a" above the earth intersecting the center line 12 of beam N which corresponds to a time interval OPN' on the range base line. The pulse of FIG. 4b corresponding to the time interval OPC' describes a constant altitude flight intersecting the center line 12 of beam C. Similarly for the remaining signals shown in FIG. 4b. The recurrent signals of FIG. 4b, occurring at different time intervals and corresponding to the successive intersection of the center lines 12 of the lobes or beams of the radar antenna by a constant altitude flight, are applied to respective differentiating circuit 17 where they are suitably shaped for operating respective one-shot multivibrator 18. Each one-shot (multivibrator) 18 operates in response to trigger signal from a respective differentiating circuit 17 for generating over their respective output leads 19 a timing pulse of proper shape for gating purposes and corresponding to the timing intervals OPA', OPB', OPC' . . . OPN' shown in FIG. 4b. The gated amplifiers 20 each receive a portion of the continuous waves available from the IF or RF oscillator 21. The amplifiers are normally in a nonoperative state and provide no output on their respective output leads 11. However, in response to a gating pulse from each of the multivibrators 18, the amplifiers 20 operate to pass to output leads 11 continuous oscillation available from source 21 for an interval corresponding to the duration of the gating pulses available from 18. The pulse modulated oscillations of proper timing are then injected into respective waveguide sections shown at 5. In the present instance where the oscillator 21 is shown to operate at an intermediate frequency, the pulsed oscillations can then be applied directly over leads 8 to the inputs of the various receiver channels shown in FIG. 1 at time intervals corresponding to particular echo range times. This process will first inject a signal into receiver channel N at a range time equivalent to altitude "a" and position OPN. In sequence, signals will be injected into the other receiver channels at the appropriate range times to simulate an echo corresponding to altitude "a." The end result is a series of signals simulating the passage of an object at a given altitude "a" through the centers 12 of the various beams defining the elevation directivity pattern.

While the invention has been described in terms wherein the radar system is stationary and the object being detected is moving, it is obvious that the invention will apply equally as well in the case where there is relative movement between the object and the object detection apparatus. Furthermore, while the invention has been described in terms of a flight at a constant altitude, it is obvious that the invention will apply equally as well in simulating the flight of an aircraft along an altitude pattern shown in dot-dash lining as $a'$. A change of simulated flight pattern would require adjustment of the timing of the flip-flop circuits 16 to provide the appropriate timing intervals corresponding to the intersection of the flight with the center 12 of the beams defining the elevation directivity pattern.

The invention has been described as involving the production of a series of recurrent pulses simulating the flight of an aircraft through the beam centers of an elevation directivity pattern where the series of signals are produced within a single pulse repetition period (see FIG. 4b). It is within the scope of this invention that the signals may be generated to occur in any integral multiple of repetition periods by adjusting the count-down generator to provide the appropriate count-down. For example, if the generator 14 were to operate to provide a 2 to 1 count-down, then the timing signals shown in 4b would be generated in a time interval corresponding to two successive pulse transmission periods.

While particular embodiments of the present invention have been shown and described, it will be obvious to those skilled in the art that changes and modifications may be made without departing from this invention in its broader aspects and therefore the aim of the appended claims is to cover all such changes and modifications as fall within the true spirit and scope of the invention.

What I claim and desire to secure by Letters Patent of the United States is:

1. An arrangement for simulating the reception, within a plurality of directivity patterns of a pulse type radar object detection system, of echoes returned from an object moving at a constant altitude above the earth wherein each pattern has a respective receiver channel associated therewith comprising a source of keying pulses synchronized with the transmission of pulses by said system, means responsive to each of said keying pulses for generating a narrow pulse occurring in the period between successive pulses at an effective range time corresponding to the crossing of the center of a respective directivity pattern by said object flying at said given altitude, a plurality of gated amplifiers, a source of carrier frequency oscillations coupled to said amplifiers, each of said amplifiers responsive to a respective one of said narrow pulses only during its occurrence for gating a portion of said oscillations to a respective output lead and means for coupling each of said leads to a respective one of said receiver channels.

2. An arrangement for simulating the reception, within a plurality of directivity patterns of a pulse type radar object detection system, of echoes returned from an object moving substantially along the circumference of a circle with the detection system located intermediate the ends of the radius of said circle wherein each pattern has a respective receiver channel associated therewith comprising a source of keying pulses synchronized with the transmission of pulses by said system, means responsive to each of said keying pulses for generating a sawtooth timing wave, a plurality of flip-flop circuits each responsive to said sawtooth wave for providing a rectilinear pulse having a width corresponding to the effective range time of a target crossing the center of a respective beam along said circumference, means for differentiating the trailing edge of each of said rectilinear pulses, means for shaping said differentiated pulses, a plurality of gated amplifiers, a source of carrier frequency oscillations coupled to said amplifiers, said amplifiers responsive to respective ones of said shaped differentiated pulses for gating a portion of said oscillations only for the duration of said shaped pulses to a respective output lead, and means for coupling each of said leads to a respective one of said receiver channels.

3. An arrangement for calibrating a pulse echo system wherein said system receives an echo in a plurality of channels each having associated therewith a respective, differently directive, reception pattern, comprising a source of recurrent keying pulses, means responsive to each keying pulse for generating a plurality of narrow pulses, each of said narrow pulses having a time occurrence with respect to said keying pulse corresponding to the range time from said system to the intersection of a simulated path of movement of an object with the effective center of a respective one of said patterns, and means for applying each of said narrow pulses to the channel associated with its respective intersected pattern.

4. An arrangement for calibrating a pulse echo system wherein said system receives an echo in a plurality of channels each having associated therewith a respective, differently directive, vertical reception pattern, comprising a source of recurrent keying pulses, means responsive to each keying pulse for generating a plurality of narrow pulses, each of said narrow pulses having a time occurrence with respect to said keying pulse corresponding to the range time from said system to the intersection of a simulated constant altitude flight of an object with the effective center of a respective one of said patterns, and means for applying each of said narrow pulses to the channel associated with its respective intersected pattern.

5. An arrangement for calibrating a pulse echo receiver wherein said receiver receives an echo in a plurality of channels each having associated therewith a respective, differently directive, reception pattern, comprising a source of recurrent keying pulses, means responsive to each keying pulse for generating a plurality of narrow pulses, each of said narrow pulses having a time occurrence with respect to said keying pulse corresponding to the range time from said system to the intersection of a simulated path of movement of an object with the effective center of a respective one of said patterns, and means for applying each of said narrow pulses to the channel associated with its respective intersected pattern.

6. An arrangement for simulating the detection by a pulse echo system located at a point on a reference surface of an object moving at a constant altitude above said reference surface wherein said system recurrently transmits pulses and receives echoes in response thereto from said object in a plurality of channels each having associated therewith a respective, differently directive, vertical reception pattern, comprising a source of keying pulses synchronized with the transmission of said pulses, means responsive to each keying pulse for generating a plurality of narrow pulses, each of said narrow pulses having a time occurrence with respect to said keying pulse corresponding to the range time from said system to the intersection of a simulated constant altitude flight of an object with the effective center of a respective one of said patterns, a plurality of gated amplifiers, a source of carrier frequency oscillations coupled to said amplifiers, each of said amplifiers responsive to a respective one of said narrow pulses for gating a portion of said oscillations to a respective output lead, and means for coupling each of said leads to the channel associated with its respective intersected pattern.

7. An arrangement for simulating the detection by a pulse echo system of an object moving along a path wherein said system recurrently transmits pulses and receives echoes in response thereto from said object in a plurality of channels each having associated therewith a respective, differently directive, reception pattern, comprising a source of keying pulses synchronized with the transmission of said pulses, means responsive to each keying pulse for generating a plurality of narrow pulses, each of said narrow pulses having a time occurrence with respect to said keying pulse corresponding to the range time from said system to the intersection of a simulated path of movement of an object with the effective center of a respective one of said patterns, a plurality of gating circuits, a source of carrier frequency oscillations coupled to said gating circuits, each of said gating circuits responsive to a respective one of said narrow pulses for gating a portion of said oscillations to the channel associated with its respective intersected pattern.

References Cited in the file of this patent

UNITED STATES PATENTS 2,433,681     Blumlein     Dec. 30, 1947